US008928593B2

(12) United States Patent
Jian

(10) Patent No.: US 8,928,593 B2
(45) Date of Patent: Jan. 6, 2015

(54) SELECTING AND UPDATING LOCATION OF VIRTUAL KEYBOARD IN A GUI LAYOUT IN RESPONSE TO ORIENTATION CHANGE OF A PORTABLE DEVICE

(75) Inventor: Jing Jian, Beijing (CN)

(73) Assignee: Beijing Hefengxin Keji Co. Ltd., Beijing (CN)

( * ) Notice: Subject to any disclaimer, the term of this patent is extended or adjusted under 35 U.S.C. 154(b) by 224 days.

(21) Appl. No.: 13/417,320

(22) Filed: Mar. 11, 2012

(65) Prior Publication Data

US 2013/0234948 A1    Sep. 12, 2013

(51) Int. Cl.
  G06F 3/02    (2006.01)
  G06F 3/041   (2006.01)
(52) U.S. Cl.
  USPC .......................................... 345/169; 345/173

(58) Field of Classification Search
  None
  See application file for complete search history.

(56) References Cited

U.S. PATENT DOCUMENTS

| 2009/0167716 A1* | 7/2009  | Wang et al.     | 345/173 |
| 2010/0188371 A1* | 7/2010  | Lowles et al.   | 345/178 |
| 2012/0133601 A1* | 5/2012  | Marshall et al. | 345/173 |
| 2012/0324381 A1* | 12/2012 | Cohen et al.    | 715/765 |

* cited by examiner

*Primary Examiner* — Joseph Haley
*Assistant Examiner* — Emily Frank
(74) *Attorney, Agent, or Firm* — Bright IP Law Offices

(57) ABSTRACT

A method of controlling the location of a virtual keyboard in a graphical user interface (GUI) displayed on a display screen of a handheld electronic device is disclosed, the method comprising: monitoring for change in device orientation, wherein the device orientation comprising a left hand device orientation and a right hand device orientation; and updating location of the virtual keyboard in the GUI in response to detection of device orientation change.

17 Claims, 9 Drawing Sheets

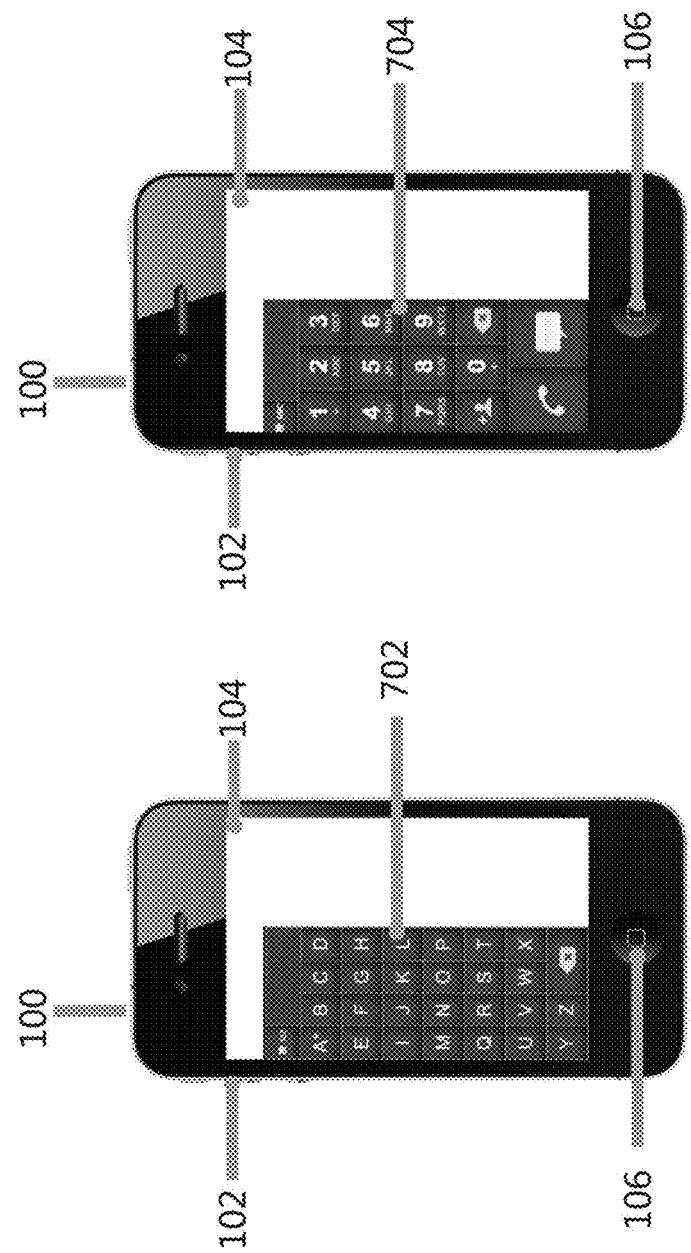

SELECTING AND UPDATING LOCATION OF VIRTUAL KEYBOARD IN A GUI LAYOUT IN RESPONSE TO ORIENTATION CHANGE OF A PORTABLE DEVICE

TECHNICAL FIELD

The disclosed embodiments relate generally to user interfaces that employ touch-sensitive displays, and more particularly to dynamically selecting and updating the location of a virtual keyboard in a GUI (graphical user interface) layout displayed on a touch screen of a handheld electronic device in accordance with whether the device is held by the left or right hand of any user.

BACKGROUND

Touch-sensitive displays (also known as "touch screens" or "touchscreens") are well known in the art. Touch screens are used in many electronic devices to display graphics and text, and to provide a user interface through which a user may interact with the devices. A touch screen detects and responds to contact on the touch screen. A device may display a GUI comprising one or more soft keys, menus, and other user-interface objects on the touch screen. A user may interact with the device by contacting the touch screen at locations corresponding to the user-interface objects with which he/she wishes to interact.

Touch screens are becoming more popular for use as displays and as user input devices on handheld electronic devices, such as mobile telephones and personal digital assistants (PDAs). FIGS. 1A and 1B illustrate a handheld electronic device 100 with a portrait and a landscape screen orientation, respectively. The handheld device 100 includes a rigid case 102 for housing the components of the handheld electronic device 100 that is configured to be held in a user's hand while the handheld electronic device 100 is in use. The handheld electronic device 100 comprises a touch screen 104 mounted within a front face of the case 102. The electronic device 100 may also comprise one or more control buttons 106 which may or may not be included in the touch screen 104. The touch screen 104 displays a GUI comprising a virtual keyboard 108 comprising one or more soft keys.

Presently in both the portrait screen orientation (as shown in FIG. 1A) and the landscape screen orientation (as shown in FIG. 1B), the virtual keyboard 108 is located in a lower portion of the GUI relative to the orientation of the touch screen 104 (and typically the current orientation of the device 100) so that it may be more easily touched (or actuated) using the thumbs or other fingers of the user while the user is holding the device 100. In some embodiments, the device components may be configured and dimensioned so that the user may hold the handheld electronic device 100 in such a manner to enable two-thumb typing on the virtual keyboard 108 using both hands. One problem associated with requiring typing by both hands is that sometimes the user may only have one hand available to hold and operate the handheld electronic device 100 while the other hand is occupied with other tasks. In such situations, the user may not be able to reach all the soft keys on the virtual keyboard 108 due to the limited length of one's thumb or any other fingers.

In other embodiments, the device components may be configured and dimensioned so that the handheld electronic device 100 can be cradled in the palm of a user's hand and the virtual keyboard 108 may be touched with the thumb of the hand of the user in which the handheld electronic device 100 is being held. One problem associated with using only one hand to both hold the handheld electronic device 100 and touch the virtual keyboard 108 which is located in the lower portion of the GUI is that the user's hand may get easily tired because he/she has to constantly stretch and stroke her thumb, for example, to compose a lengthy email message. In yet other embodiments, as the device dimension increases in order to provide more functionalities and/or larger screen display, it will become more difficult for a user to both hold the device 100 and touch the virtual keyboard 108 when the keyboard 108 is located in the lower portion of the GUI as shown in FIGS. 1A and 1B.

These drawbacks may reduce the ease of use of the virtual keyboard user interface and, as a consequence, the ease of use of the handheld electronic device 100 in general. Accordingly, there is a need for a more user-friendly interface for text and number input using the virtual keyboard.

SUMMARY

In accordance with some embodiments described below, a method of controlling the location of a virtual keyboard in a graphical user interface (GUI) displayed on a display screen of a handheld electronic device is disclosed, the method comprising: monitoring for change in device orientation, wherein the device orientation comprising a left hand device orientation and a right hand device orientation; and updating location of the virtual keyboard in the GUI in response to detection of device orientation change.

In accordance with some embodiments described below, a portable electronic device comprises: a touch-sensitive display; memory; one or more processors; and one or more modules stored in the memory and configured for execution by the one or more processors, the one or more modules including instructions: to monitor for change in device orientation, wherein the device orientation comprising a left hand device orientation and a right hand device orientation; and to update location of the virtual keyboard in the GUI in response to detection of device orientation change.

In accordance with some embodiments described below, a computer program product for use in conjunction with a portable electronic device comprises a touch-sensitive display, the computer program product comprising a computer readable storage medium and a computer program mechanism embedded therein. The computer program mechanism comprises instructions for: monitoring for change in device orientation, wherein the device orientation comprising a left hand device orientation and a right hand device orientation; and updating location of the virtual keyboard in the GUI in response to detection of device orientation change.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 7A illustrates the GUI of a device that displays an exemplary virtual keyboard for text input, according to some embodiments of the invention.

FIG. 7B illustrates the GUI of a device that displays an exemplary virtual keyboard for phone application, according to some embodiments of the invention.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 2:
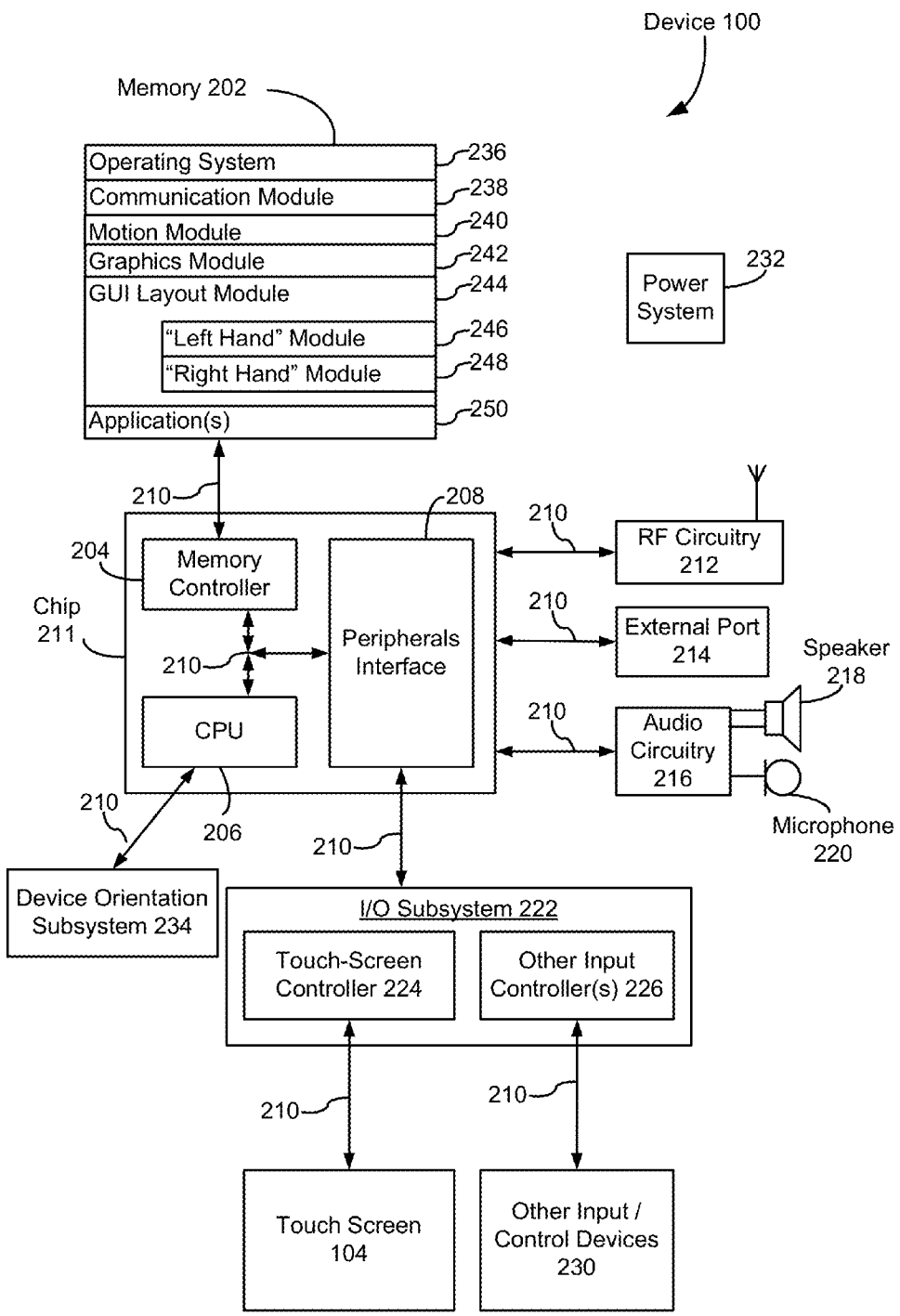
FIG. 2 is a block diagram illustrating a handheld electronic device, according to some embodiments of the invention.

FIG. 2 illustrates a portable electronic device 100, according to some embodiments of the invention. The device 100 includes a memory 202, a memory controller 204, one or more processing units (CPU's) 206, a peripherals interface 208, RF (radio frequency) circuitry 212, an external port 214, audio circuitry 216, a speaker 218, a microphone 220, an input/output (I/O) subsystem 222, a touch screen 104, other input or control devices 230, a power system 232, and a device orientation subsystem 234. These components communicate over the one or more communication buses or signal lines 210. The device 100 can be any portable electronic device, including but not limited to a handheld computer, a tablet computer, a mobile phone, a media player, a personal digital assistant (PDA), or the like, including a combination of two or more of these items. It should be appreciated that the device 100 is only one example of a portable electronic device 100, and that the device 100 may have more or fewer components than shown, or a different configuration of components. The various components shown in FIG. 2 may be implemented in hardware, software or a combination of both hardware and software, including one or more signal processing and/or application specific integrated circuits.

The memory 202 may include high speed random access memory and may also include non-volatile memory, such as one or more magnetic disk storage devices, flash memory devices, or other non-volatile solid state memory devices. In some embodiments, the memory 202 may further include storage remotely located from the one or more processors 206, for instance network attached storage accessed via the RF circuitry 212 or external port 214 and a communications network (not shown) such as the Internet, intranet(s), Local Area Networks (LANs), Wide Local Area Networks (WLANs), Storage Area Networks (SANs) and the like, or any suitable combination thereof. Access to the memory 202 by other components of the device 100, such as the CPU 206 and the peripherals interface 208, may be controlled by the memory controller 204.

The peripherals interface 208 couples the input and output peripherals of the device 100 to the CPU 206 and the memory 202. The one or more processors 206 run various software programs and/or sets of instructions stored in the memory 202 to perform various functions for the device 100 and to process data.

In some embodiments, the peripherals interface 208, the CPU 206, and the memory controller 204 may be implemented on a single chip, such as a chip 211. In some other embodiments, they may be implemented on separate chips.

The RF circuitry 212 receives and sends electromagnetic waves. The RF circuitry 212 converts electrical signals to/from electromagnetic waves and communicates with communications networks and other communications devices via the electromagnetic waves. The RF circuitry 212 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 212 may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 216, the speaker 218, and the microphone 220 provide an audio interface between a user and the device 100. The audio circuitry 216 receives audio data from the peripherals interface 208, converts the audio data to an electrical signal, and transmits the electrical signal to the speaker 218. The speaker converts the electrical signal to human-audible sound waves. The audio circuitry 216 also receives electrical signals converted by the microphone 220 from sound waves. The audio circuitry 216 converts the electrical signal to audio data and transmits the audio data to the peripherals interface 208 for processing. Audio data may be may be retrieved from and/or transmitted to the memory 202 and/or the RF circuitry 212 by the peripherals interface 208. In some embodiments, the audio circuitry 216 also includes a headset jack (not shown). The headset jack provides an interface between the audio circuitry 216 and removable audio input/output peripherals, such as output-only headphones or a headset with both output (headphone for one or both ears) and input (microphone).

The I/O subsystem 222 provides the interface between input/output peripherals on the device 100, such as the touch screen 104 and other input/control devices 230, and the peripherals interface 208. The I/O subsystem 222 includes a touch-screen controller 224 and one or more input controllers 226 for other input or control devices 230. The one or more input controllers 226 receive/send electrical signals from/to other input or control devices 230. The other input or control devices 230 may include physical buttons (e.g., push buttons, rocker buttons, etc.), dials, slider switches, sticks, and so forth.

The touch screen 104 provides both an output interface and an input interface between the device 100 and a user. The touch-screen controller 224 receives/sends electrical signals from/to the touch screen 104. The touch screen 104 displays visual output to the user. The visual output may include text, graphics, video, and any combination thereof. Some or all of the visual output may correspond to user-interface objects, further details of which are described below.

The touch screen 104 also accepts input from the user based on haptic and/or tactile contact. The touch screen 104 forms a touch-sensitive surface that accepts user input. The touch screen 104 and the touch screen controller 224 (along with any associated modules and/or sets of instructions in the memory 202) detects contact (and any movement or break of the contact) on the touch screen 104 and converts the detected contact into interaction with user-interface objects, such as one or more soft keys, that are displayed on the touch screen 104. The touch screen 104 may use LCD (liquid crystal display) technology, or LPD (light emitting polymer display) technology, although other display technologies may be used in other embodiments. The touch screen 104 and touch screen controller 224 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 104. The touch-sensitive display may be analogous to the multi-touch sensitive tablets described in the following U.S. Patents: U.S. Pat. No. 6,323,846 (Westerman et al.), U.S. Pat. No. 6,570, 557 (Westerman et al.), and/or U.S. Pat. No. 6,677,932 (Westerman), and/or U.S. Pat. No. 6,888,536 (Westerman et al.), each of which is hereby incorporated by reference. However, the touch screen 104 displays visual output from the portable device 100, whereas touch sensitive tablets do not provide visual output. The touch screen 104 may have a resolution in excess of 100 dpi. In an exemplary embodiment, the touch screen 104 may have a resolution of approximately 168 dpi. The user may make contact with the touch screen 104 using any suitable object or appendage, such as a stylus, finger, and so forth.

In some embodiments, in addition to the touch screen 104, the device 100 may include a touchpad (not shown) for activating or deactivating particular functions. In some embodiments, the touchpad is a touch-sensitive area of the device 100 that, unlike the touch screen 104, does not display visual output. The touchpad may be a touch-sensitive surface that is separate from the touch screen 104 or an extension of the touch-sensitive surface formed by the touch screen 104.

The device 100 also includes a power system 232 for powering the various components. The power system 232 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Additionally, the device 100 includes a device orientation subsystem 234 for measuring the orientation of the device 100. The device orientation subsystem 234 comprises at least one sensor which is connected to the CPU 206 and which is controlled by one or a combination of a monitoring circuit and operating software, e.g., the motion module 240 described below. The sensor detects the orientation of the device 100 or information from which the orientation of the device 100 can be determined, such as acceleration. In some embodiments, the sensor is a three-axis accelerometer. In other embodiments, an orientation sensor other than an accelerometer could be used such as a gravity sensor, a gyroscope, a tilt sensor, an electronic compass or other suitable sensor, or combinations thereof. In some embodiments, the device orientation subsystem 234 may comprise two or more sensors such as an accelerometer and an electronic compass.

Figure 3:
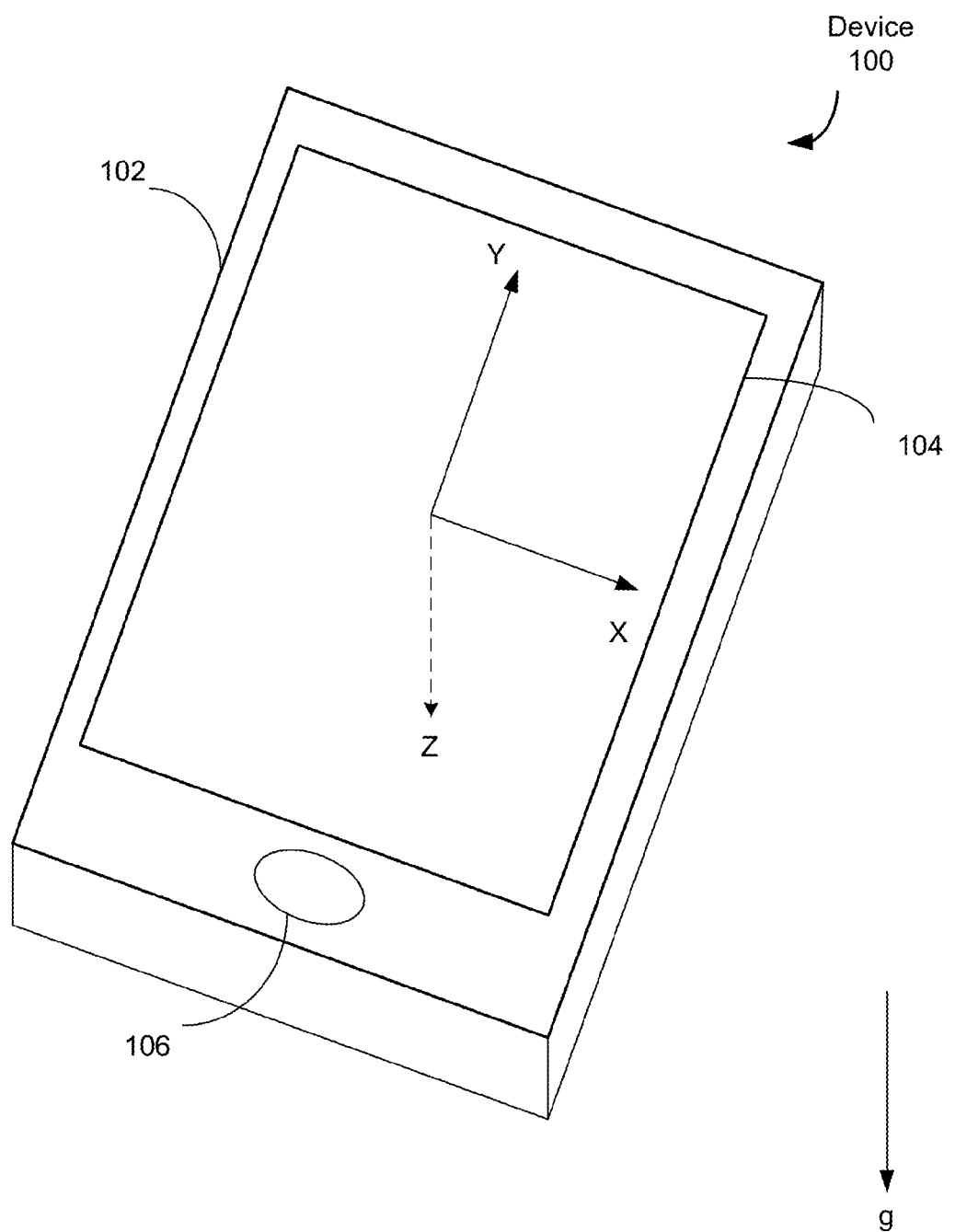
FIG. 3 is a schematic diagram illustrating a three-dimensional Cartesian coordinate system for a three-axis accelerometer, according to some embodiments of the invention.

As will be appreciated by persons skilled in the art, an accelerometer is a sensor which converts acceleration from motion (e.g., movement of the device 100 or a portion thereof due to the strike force) and gravity which are detected by a sensing element into an electrical signal (producing a corresponding change in output) and is available in one, two or three axis configurations. Accelerometers may produce digital or analog output signals depending on the type of accelerometer. The accelerometer may be of almost any type including, but not limited to, a capacitive, piezoelectric, piezoresistive, or gas-based accelerometer. The output of an accelerometer is typically measured in terms of the gravitational acceleration constant at the Earth's surface, denoted 1 g (as shown in FIG. 3), which is approximately 9.81 m/s$^2$ (32.2 ft/s$^2$) as the standard average. The range of accelerometers vary up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland.

In an exemplary embodiment, a three-axis accelerometer is used to measure the orientation of the device 100. FIG. 3 illustrates a three-dimensional Cartesian coordinate system for the three-axis accelerometer, according to some embodiments of the invention. As illustrated in FIG. 3, each measurement axis of the three-axis accelerometer is aligned with an axis of the device 100. The x-axis and y-axis are typically aligned with the input plane of the touch screen 104. The z-axis is perpendicular to the horizontal plane and detects when the device 100 is moved vertically. The measurements from the x, y and z-axes of the three-axis accelerometer may be expressed as $X_{sensor}$, $Y_{sensor}$ and $Z_{sensor}$.

Figure 4:
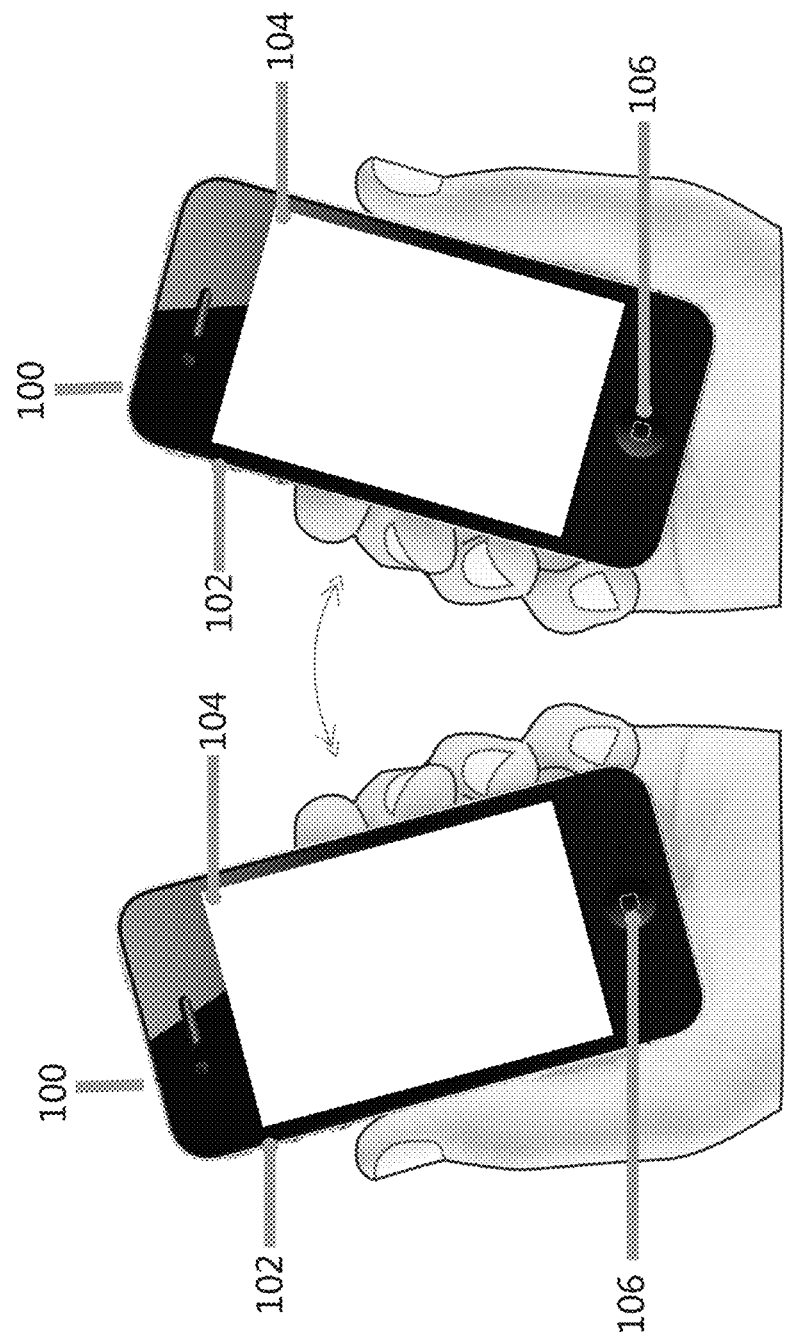
FIG. 4A illustrates a handheld electronic device in the "left hand" device orientation, according to some embodiments of the invention.
FIG. 4B illustrates a handheld electronic device in the "right hand" device orientation, according to some embodiments of the invention.

FIGS. 4A and 4B illustrate the device 100 in two predefined device orientations according to some embodiments of the invention. As shown in FIG. 4A, a predefined "left hand" device orientation corresponds to the orientation of the device 100 when it is held by the left hand of a user. In this orientation, the x-axis of the accelerometer tilts to the left while the z-axis maintains substantially vertical. FIG. 4B illustrates a predefined "right hand" device orientation which corresponds to the orientation of the device 100 when it is held by the right hand of a user. In this orientation, the x-axis of the accelerometer tilts to the right while the z-axis maintains substantially vertical. Other device orientations are possible and could be used in other embodiments.

It will be appreciated that the device 100 needs not be oriented precisely in one of the illustrated device orientations in FIGS. 4A and 4B for the determination of the orientation of the device 100. Instead, the predefined device orientations act as reference positions. The orientation of the device 100 is determined by selecting the reference position, e.g., which of the two predefined device orientations shown in FIGS. 4A and 4B is closest to the actual device orientation. Each of the two predefined device orientations may be mapped to orientation values measured by the device orientation subsystem 234 or derived from its measurements in order to determine the reference position which is closest to the actual device orientation. The orientation values may be used to construct an orientation profile of each of the two predefined device orientations. In one preferred embodiment, the orientation values which are mapped to the "left hand" device orientation are $X_{sensor}<-0.8$ and $Z_{sensor}>-0.5$ while the orientation values which are mapped to the "right hand" device orientation are $X_{sensor}>0.8$ and $Z_{sensor}>-0.5$.

Referring back to FIG. 2, the software components of the device 100 include an operating system 236, a communication module (or set of instructions) 238, a motion module (or set of instructions) 240, a graphics module (or set of instructions) 242, a GUI layout module (or set of instructions) 244, and one or more applications (or set of instructions) 250.

The operating system 236 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 238 facilitates communication with other devices over one or more external ports 214 and also includes various software components for handling data received by the RF circuitry 212 and/or the external port 214. The external port 214 (e.g., Universal Serial Bus (USB), FIREWIRE, etc.) is adapted for coupling directly to other devices or indirectly over a network (e.g., the Internet, wireless LAN, etc.).

The motion module 240 detects movement of the device 100, in conjunction with the device orientation subsystem 234. The motion module 240 includes various software components for performing various operations related to detection of movement of the device 100, such as determining if movement has occurred and determining the magnitude and direction of the movement, e.g., the value and sign of $X_{sensor}$, $Y_{sensor}$ and the $Z_{sensor}$. As a result, the motion module 240 may determine the current orientation of the device 100 following a movement.

The graphics module 242 includes various known software components for rendering and displaying graphics on the touch screen 104. Note that the term "graphics" includes any object that can be displayed to a user, including without limitation text, web pages, icons (such as user-interface objects including a virtual keyboard), digital images, videos, animations and the like.

Figure 5:
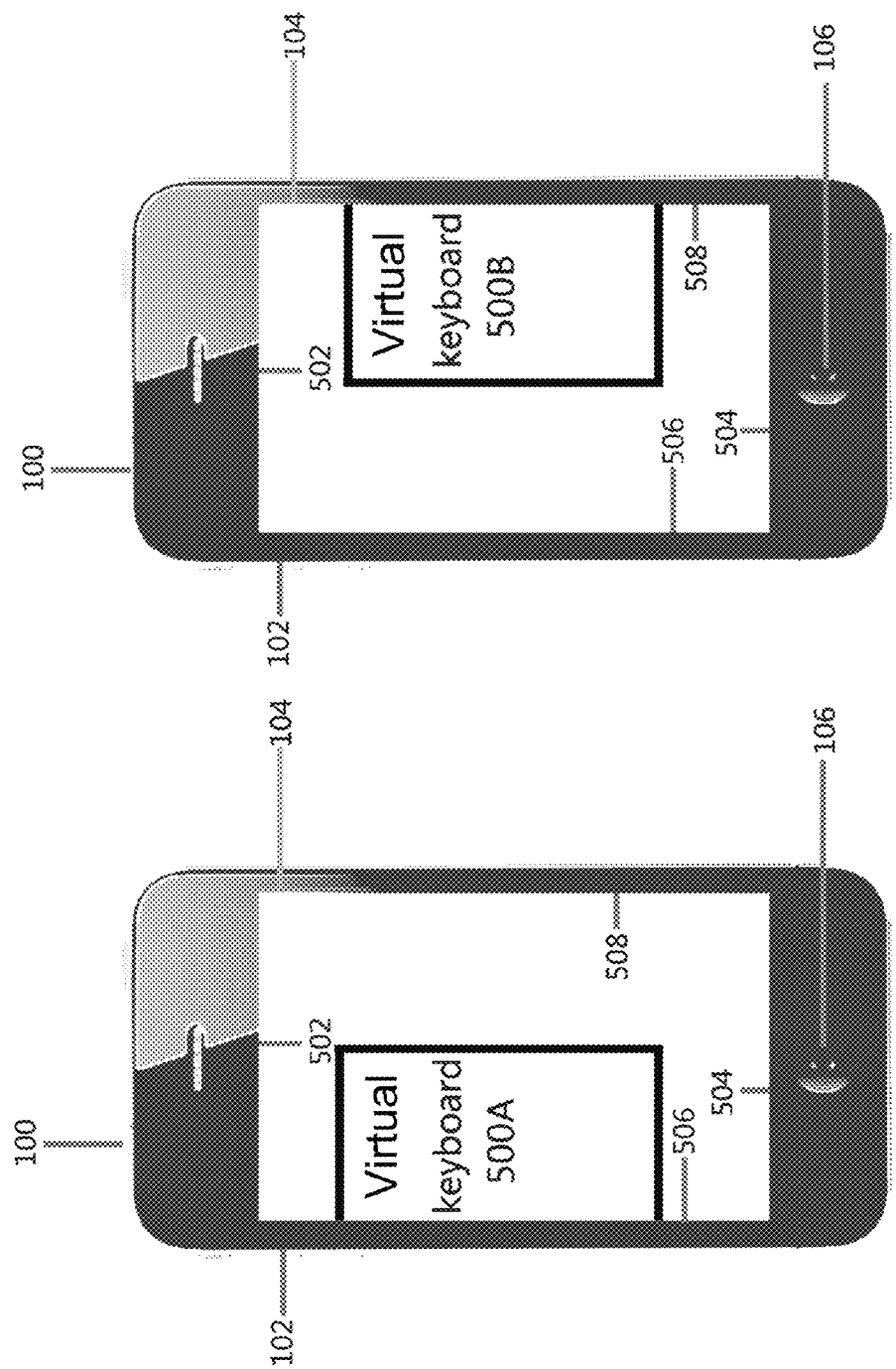
FIG. 5A illustrates the "left hand" GUI screen layout displayed on the touch screen of a handheld electronic device, according to some embodiments of the invention.
FIG. 5B illustrates the "right hand" GUI screen layout displayed on the touch screen of a handheld electronic device, according to some embodiments of the invention.

The GUI layout module 244 implements a GUI on the touch screen 104, in conjunction with the touch-screen controller 224. In some embodiments, the GUI layout module 244 uses input from the motion module 240 to select and update the GUI layout displayed on the touch screen 104 in accordance with the current orientation of the device 100. In some embodiments, there are two predefined GUI screen layouts comprising: a "left hand" GUI screen layout (as shown in FIG. 5A) and a "right hand" GUI screen layout (as shown in FIG. 5B). The GUI layout module 244 selects one of these two predefined GUI screen layouts in accordance with mappings of screen layout to device orientation as follows. When the device orientation is "left hand" device orientation (as shown in FIG. 4A), i.e., the user holds the device 100 in his/her left hand, the "left hand" GUI screen layout is selected and displayed on the device 100. When the device orientation is "right hand" device orientation (as shown in FIG. 4B), i.e., the user holds the device 100 in his/her right hand, the "right hand" GUI screen layout is selected and used to present the GUI on the touch screen 104.

Figure 1A:
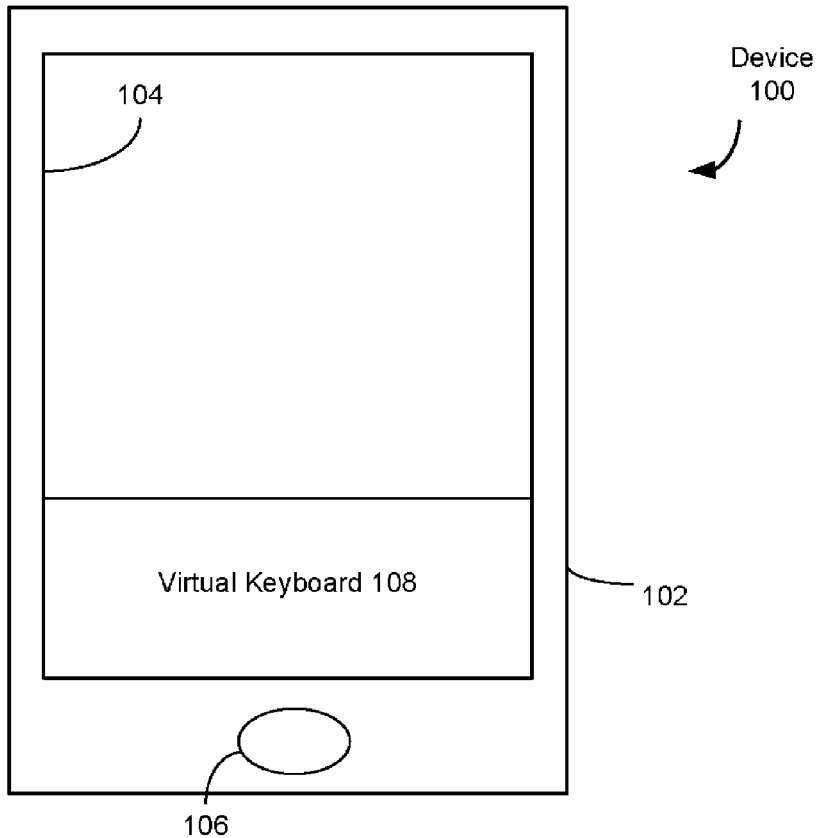
FIG. 1A illustrates a handheld electronic device having a portrait screen orientation in a virtual keyboard mode.

Detailed description of the two predefined GUI screen layouts is now provided with reference to FIGS. 5A and 5B. As described in connection with FIG. 1, the device 100 includes a rigid case 102, a touch screen 104, and one or more control buttons 106. The touch screen 104 has opposed top and bottom ends designated by references 502, 504 respectively, and left and right sides designated by references 506, 508 respectively which extend transverse to the top and bottom ends 502, 504. In the shown embodiments of FIGS. 5A and 5B, the touch screen 104 (and the device 100 and case 102) is elongate having a length defined between the top and bottom ends 502, 504 longer than a width defined between the left and right sides 506, 508. Other device dimensions are also possible.

In the "left hand" GUI screen layout illustrated in FIG. 5A, the virtual keyboard 500A is located abutting the left side 506 of the touch screen 104 so that the soft keys (not shown) in the virtual keyboard 500A may be more easily touched (or actuated) using the thumb of the left hand of the user. Although the virtual keyboard 500A is shown as in the middle portion of the length of the touch screen 104 (as defined between the top and bottom ends 502, 504), it is to be understood that the virtual keyboard 500A may be located anywhere in the upper, the lower or the entire portion of the length along the left side 506 of the touch screen 104 in some embodiments. In other embodiments, the virtual keyboard 500A may occupy a larger or smaller portion of the touch screen 104 than that shown in FIG. 5A.

In the "right hand" GUI screen layout illustrated in FIG. 5B, the virtual keyboard 500B is located abutting the right side 508 of the touch screen 104 so that the soft keys (not shown) in the virtual keyboard 500B may be more easily touched (or actuated) using the thumb of the right hand of the user. Although the virtual keyboard 500B is shown as in the middle portion of the length of the touch screen 104 (as defined between the top and bottom ends 502, 504), it is to be understood that the virtual keyboard 500B may be located anywhere in the upper, the lower or the entire portion of the length along the right side 508 of the touch screen 104 in some embodiments. In other embodiments, the virtual keyboard 500B may occupy a larger or smaller portion of the touch screen 104 than that shown in FIG. 5B.

Referring back to FIG. 2, the GUI layout module 244 may include a "left hand" module 246 and a "right hand" module 248. The "left hand" module 246 detects satisfaction of any of one or more conditions to display the "left hand" GUI screen layout (as shown in FIG. 5A) on the touch screen 104 and to display the "left hand" GUI screen layout on the touch screen 104. The "right hand" module 248 detects satisfaction of any of one or more conditions to display to display the "right hand" GUI screen layout (as shown in FIG. 5B) on the touch screen 104 and to display the "right hand" GUI screen layout on the touch screen 104. It should be appreciated that the GUI layout module 244 may interact and work in conjunction with motion module 240 and graphics module 242 when performing the above-described functions.

The modules 240, 242 and 244 may, among other things, each be implemented through stand-alone software applications, or combined together in one or more of the operating system 236 and applications 250. In some example embodiments, the functions performed by each of the above identified modules 240, 242 and 244 may each be realized as a plurality of independent elements, rather than a single integrated element, and any one or more of these elements may be implemented as parts of other software applications.

Still referring to FIG. 2, the one or more applications 250 can include any applications installed on the device 100, including without limitation, a browser, address book, contact list, email, instant messaging, word processing, map, calendar, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device 100 may include the functionality of an MP3 player, such as an iPod (trademark of Apple Computer, Inc.). The device 100 may, therefore, include a 36-pin connector that is compatible with the iPod. In some embodiments, the device 100 may include one or more optional optical sensors (not shown), such as CMOS or CCD image sensors, for use in imaging applications.

In some embodiments, the device 100 is a device where operation of a predefined set of functions on the device is performed exclusively through the touch screen 104 and, if included on the device 100, the touchpad. By using the touch screen and touchpad as the primary input/control device for operation of the device 100, the number of physical input/control devices (such as push buttons, dials, and the like) on the device 100 may be reduced. In one embodiment, the device 100 includes the touch screen 104, the touchpad, a push button for powering the device on/off and locking the device, a volume adjustment rocker button and a slider switch for toggling ringer profiles. The push button may be used to turn the power on/off on the device by depressing the button and holding the button in the depressed state for a predefined time interval, or may be used to lock the device by depressing the button and releasing the button before the predefined time interval has elapsed. In an alternative embodiment, the device 100 also may accept verbal input for activation or deactivation of some functions through the microphone 220.

The predefined set of functions that are performed exclusively through the touch screen and the touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 6:
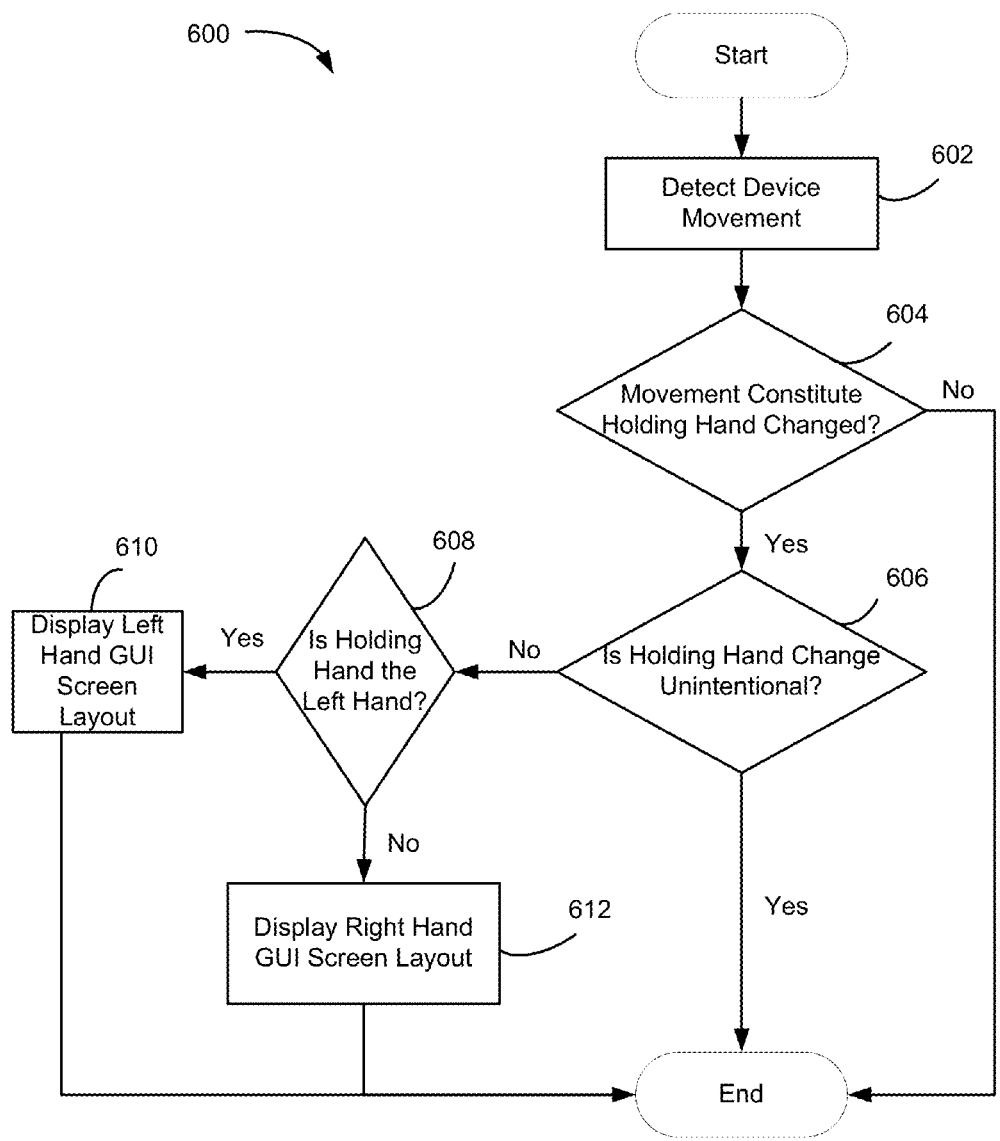
FIG. 6 is a flowchart illustrating a process for dynamically selecting and updating the GUI screen layout, according to some embodiments of the invention.

FIG. 6 is a flowchart illustrating a process 600 for dynamically selecting and updating the GUI screen layout to effectuate a different location of the virtual keyboard on the touch screen 104 according to some embodiments of the invention. While the process flow 600 described below includes a number of operations that appear to occur in a specific order, it should be apparent that these processes can include more or fewer operations, which can be executed serially or in parallel (e.g., using parallel processors or a multi-threading environment).

In step 602, movement of the device 100 is measured by the device orientation subsystem 234 (e.g., the three-axis accelerometer). As described earlier, the measurements from the x, y and z-axes of the three-axis accelerometer are expressed as $X_{sensor}$, $Y_{sensor}$ and $Z_{sensor}$. When a device motion occurs, at least one of $X_{sensor}$, $Y_{sensor}$ and $Z_{sensor}$ changes its value and/or sign.

One example of device movement is when the hand holding the device 100 changes from the left to right hand, or vice versa. Such movement occurs when the user switches the device from his/her left to right hand or from right to left hand, or when a right-handed user hands the device 100 from his/her right hand to the left hand of a left-handed user. In step 604, the motion module 240 determines whether the amount of device movement constitutes a change in the holding hand orientation (i.e., left or right hand) based on input from the device orientation subsystem 234. In some embodiments, this determination is based on movement of the device 100 in the x-axis, i.e., it can be determined that the holding hand orientation changes when the value of $X_{sensor}$ changes from a large positive number (e.g., $X_{sensor}>0.8$) to a large negative number (e.g., $X_{sensor}>0.8$) while the value of $Z_{sensor}$ remains a large negative number (e.g., $Z_{sensor}>-0.5$), which corresponds to the vertical position of the device 100 when the user naturally holds the device 100 with one hand while he/she dials a phone number or composes a message using the touch screen 104. In some embodiments, when the motion module 240 detects a holding hand orientation change, it also determines the current orientation of the device 100, i.e., either "left hand" or "right hand" device orientation.

It is noted that it would be undesirable to adjust the GUI screen layout to effectuate a different location of the virtual keyboard when a detected holding hand orientation change is unintentional. For example, if the device 100 is changed to a device orientation for a small fraction of time and then changed back into its initial device orientation, the motion might be considered as an accidental movement, and thus, can be ignored. Otherwise, adjusting the GUI screen layout to effectuate a different location of the virtual keyboard may unnecessarily consume power and other resources of the device 100. Accordingly, the process as in step 606 determines whether the detected holding hand orientation change is unintentional (or temporary). This can be based on a duration threshold, whereby if the threshold is exceeded (or otherwise satisfied), the movement is deemed to be intentional (and not temporary). This time threshold can be predefined by the manufacturer or specified by the user.

If the detected hand change is not temporary, in step 608, the GUI layout module 244 selects the appropriate GUI screen layout in accordance with the detected device orientation, and in steps 610 and 612, updates the GUI display on the touch screen 104 to place the virtual keyboard on either the left or right side of the touch screen 104 in response to whether the holding hand is a left or a right hand, respectively. As a result, the user may maintain the same proximity of the typing thumb (or other fingers) to the virtual keyboard when he/she switches the device 100 from one hand to the other. The same user-friendliness is provided when the device 100 is moved from the left hand of one user to the right hand of another user, for example, from the left hand of a left-handed user to the right hand of a right-handed user, and vice versa. It is to be understood that according to some other embodiments of the invention, the selecting and updating the location of the virtual keyboard can also be triggered by a user input, e.g., by pushing a button or a key on the case 102 or the touch screen 104 of the device 100, instead of by a detected device orientation change as described herein.

It is contemplated that the plurality of soft keys in a virtual keyboard may comprise various layouts and configurations to be used with different device applications. Illustrated in FIG. 7A is one exemplary virtual keyboard for text entry in association with such applications as email messaging, instant messaging, task list, calendar and notepad, according to some embodiments of the invention. The virtual keyboard 702 comprises a plurality of alphanumeric keys, a space bar key, and one or more non-alphanumeric command and/or control keys, such as an "ENTER" key and a "BACKSPACE" key. In some embodiments, the virtual keyboard 702 may comprise a full keyboard comprising a plurality of keys each having an alphabetic letter associated with the key on one letter per key basis. In other embodiments, a reduced keyboard is provided comprising a plurality of keys each having an alphabetic letter associated with the key on multiple letters per key basis. While the embodiment shown in FIG. 7A utilizes a "left hand" GUI screen layout, it should be appreciated that the virtual keyboard 702 may also be used in connection with a "right hand" GUI screen layout according to other embodiments of the invention.

FIG. 7B illustrates another exemplary virtual keyboard for use with phone application according to some embodiments of the invention. The virtual keyboard 704 comprises a plurality of numeric keys and one or more specialized keys, such as a hang up key to end a voice call, and an answer key to answer an incoming voice call or to initiate an outgoing voice call. While the embodiment shown in FIG. 7B utilizes a "left hand" GUI screen layout, it should be appreciated that the virtual keyboard 704 may also be used in connection with a "right hand" GUI screen layout according to other embodiments of the invention.

Figure 8A:
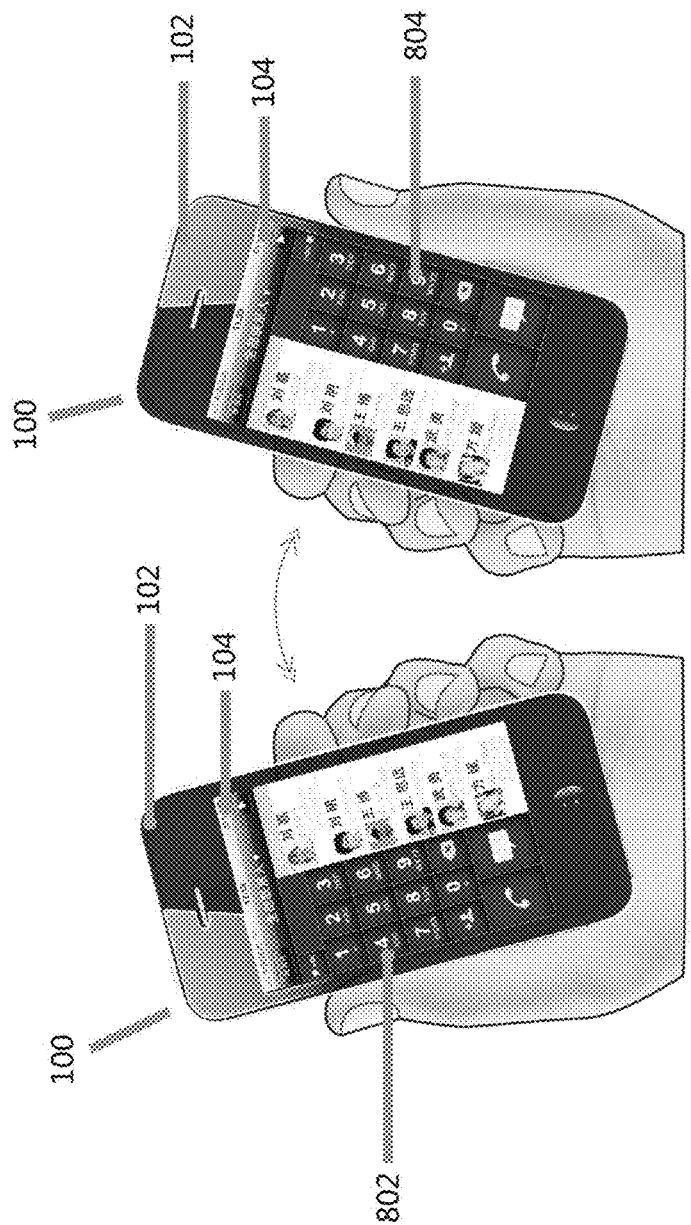
FIG. 8A is a screen shot illustrating both the "left hand" and "right hand" GUI screen layout of a device that displays an exemplary virtual keyboard for phone application, according to some embodiments of the invention.
Figure 8B:
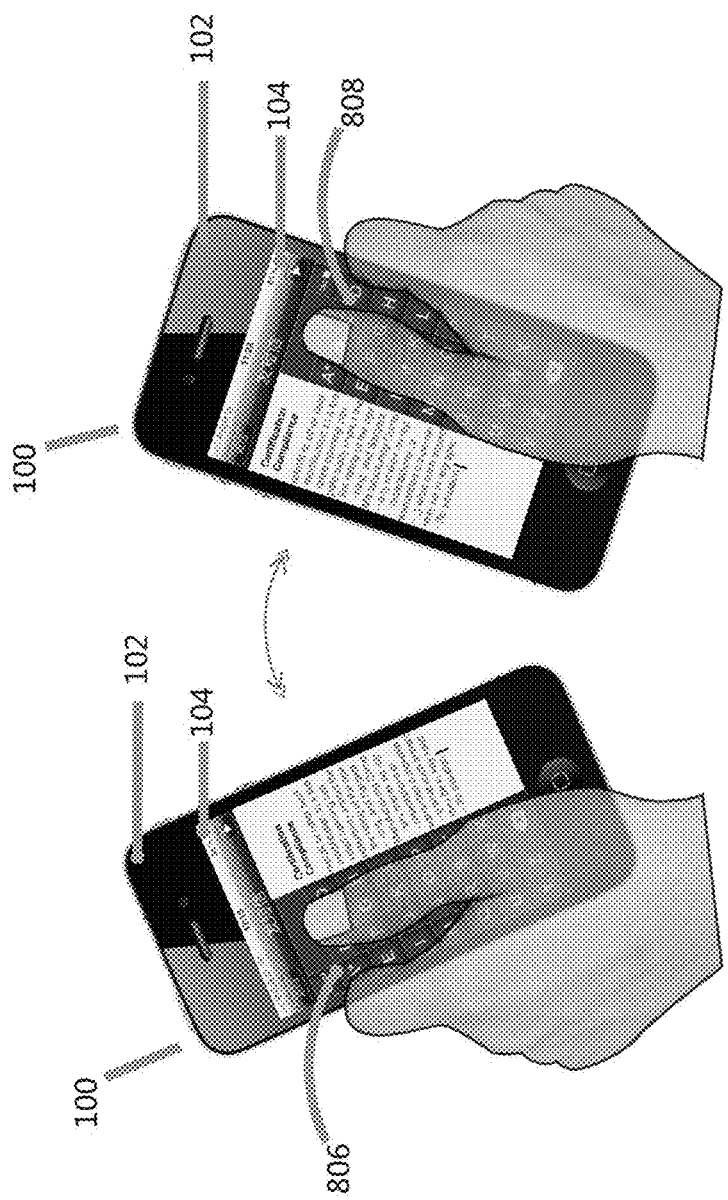
FIG. 8B is a screen shot illustrating both the "left hand" and "right hand" GUI screen layout of a device that displays an exemplary virtual keyboard for text input, according to some embodiments of the invention.

While the virtual keyboard may have different layouts and configurations, the layout and configuration of the virtual keyboard for a given application (e.g., phone or email messaging) is fixed and remains the same for both the "left hand" and "right hand" GUI screen layout. FIGS. 8A and 8B are screen shots illustrating both the "left hand" and "right hand" GUI screen layout of a device that displays an exemplary virtual keyboard for phone application and text input, respectively, according to some embodiments of the invention. While the virtual keyboards 802 and 804 are located on the opposite sides of the touch screen 104, they are identical in terms of the layout and configuration. Similarly, the virtual keyboards 806 and 808 have identical layout and configuration of individual soft keys with the keyboards. In other words, when the user switches the device 100 from one hand to the other, the relative positions among the individual soft keys in the virtual keyboard do not change while the location of the virtual keyboard will move from one side of the touch screen to the other side.

Figure 1B:
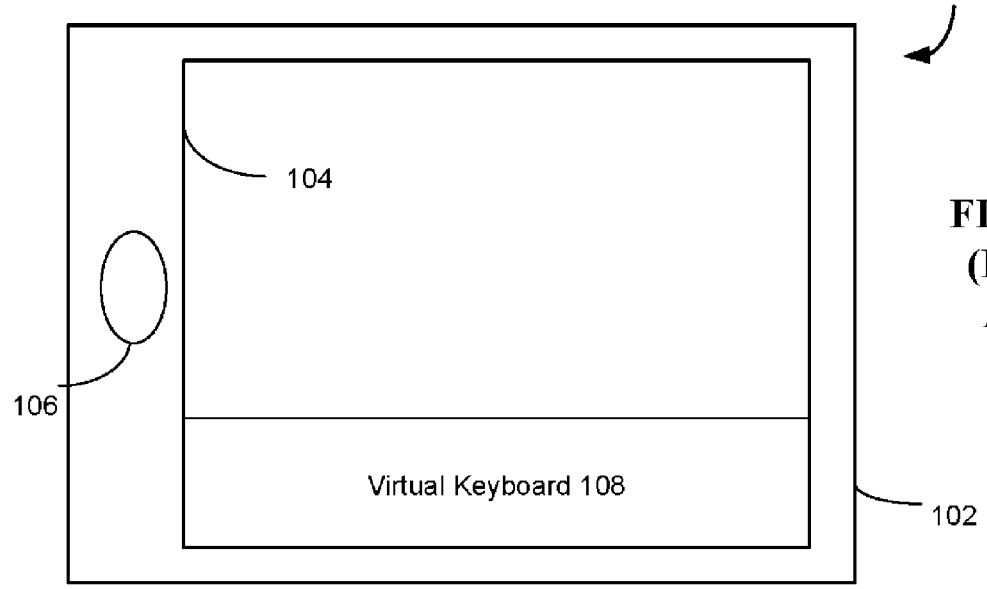
FIG. 1B illustrates a handheld electronic device having a landscape screen orientation in a virtual keyboard mode.

In the foregoing description, example GUI screen layouts and virtual keyboard layouts are illustrated for the portrait screen orientation only as this is typically considered the "normal" operating position of the device 100. It is to be understood, however, that the above description in connection with the GUI screen layouts and virtual keyboard layouts also applies when the device 100 is in landscape screen orientation (as shown in FIG. 1B).

While the invention may be primarily described in terms of methods, a person of ordinary skill in the art will understand that the invention is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the invention.

The term "non-transitory computer readable storage medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of controlling the location of a virtual keyboard in a graphical user interface (GUI) displayed on a display screen of a handheld electronic device, the method comprising:
monitoring for change in device orientation, wherein the device orientation includes a left hand device orientation and a right hand device orientation,
the monitoring further including:
detecting a set of movement parameters of the handheld electronic device, the set of movement parameters including multiple spatial movement parameters and one temporal movement parameter; and
determining whether the spatial movement parameters satisfy a predefined spatial movement condition to change the device orientation and the temporal movement parameter satisfies a predefined temporal movement condition to confirm the change of the device orientation; and
updating location of the virtual keyboard in the GUI in accordance with a satisfaction of the predefined spatial movement condition and the predefined temporal movement condition.

2. The method of claim 1, wherein the predefined temporal movement condition is satisfied when the spatial movement parameters satisfies the predefined spatial movement condition for at least a predefined period of time.

3. The method of claim 1, wherein the predefined spatial movement condition is satisfied when the device's horizontal movement exceeds a first predefined threshold and the device's vertical movement is less than a second predefined threshold.

4. The method of claim 1, wherein updating location of the virtual keyboard comprising placing the virtual keyboard on the left side of the GUI when the detected device orientation is changed from right hand device orientation to left hand device orientation and placing the virtual keyboard on the right side of the GUI when the detected device orientation is changed from left hand device orientation to right hand device orientation.

5. The method of claim 4, wherein updating location of the virtual keyboard further comprising keeping the relative positions of a plurality of soft keys on the virtual keyboard fixed during updating.

6. The method of claim 1, wherein the virtual keyboard is for phone application.

7. The method of claim 1, wherein the virtual keyboard is for text input.

8. A portable electronic device, comprising:
a touch-sensitive display;
memory;
one or more processors; and
one or more modules stored in the memory and configured for execution by the one or more processors, the one or more modules including instructions:
  to monitor for change in device orientation, wherein the device orientation includes a left hand device orientation and a right hand device orientation,
  the monitor instruction further including instructions:
    to detect a set of movement parameters of the handheld electronic device, the set of movement parameters including multiple spatial movement parameters and one temporal movement parameter; and
    to determine whether the spatial movement parameters satisfy a predefined spatial movement condition to change the device orientation and the temporal movement parameter satisfies a predefined temporal movement condition to confirm the change of the device orientation; and
  to update location of the virtual keyboard in the GUI in accordance with a satisfaction of the predefined spatial movement condition and the predefined temporal movement condition.

9. The portable electronic device of claim 8, wherein the predefined temporal movement condition is satisfied when the spatial movement parameters satisfies the predefined spatial movement condition for at least a predefined period of time.

10. The portable electronic device of claim 8, wherein the predefined spatial movement condition is satisfied when the device's horizontal movement exceeds a first predefined threshold and the device's vertical movement is less than a second predefined threshold.

11. The portable electronic device of claim 8, wherein the one or more modules including instructions to place the virtual keyboard on the left side of the GUI when the detected device orientation is changed from right hand device orientation to left hand device orientation and to place the virtual keyboard on the right side of the GUI when the detected device orientation is changed from left hand device orientation to right hand device orientation.

12. The portable electronic device of claim 8, wherein the one or more modules including instructions to keep the relative positions of a plurality of soft keys on the virtual keyboard fixed during updating.

13. A non-transitory computer readable storage medium storing a computer program product for use in conjunction with a portable electronic device comprising one or more processors and a touch-sensitive display, the computer program product comprising one or more program modules to be executed by the one or more processors, the one or more program modules comprising instructions for:
  monitoring for change in device orientation, wherein the device orientation includes a left hand device orientation and a right hand device orientation,
  the monitoring further including:
    detecting a set of movement parameters of the handheld electronic device, the set of movement parameters including multiple spatial movement parameters and one temporal movement parameter; and
    determining whether the spatial movement parameters satisfy a predefined spatial movement condition to change the device orientation and the temporal movement parameter satisfies a predefined temporal movement condition to confirm the change of the device orientation; and
  updating location of the virtual keyboard in the GUI in accordance with a satisfaction of the predefined spatial movement condition and the predefined temporal movement condition.

14. The non-transitory computer readable storage medium of claim 13, wherein the predefined temporal movement condition is satisfied when the spatial movement parameters satisfies the predefined spatial movement condition for at least a predefined period of time.

15. The non-transitory computer readable storage medium of claim 13, wherein the predefined spatial movement condition is satisfied when the device's horizontal movement exceeds a first predefined threshold and the device's vertical movement is less than a second predefined threshold.

16. The non-transitory computer readable storage medium of claim 13, wherein the computer program mechanism including instructions to place the virtual keyboard on the left side of the GUI when the detected device orientation is changed from right hand device orientation to left hand device orientation and to place the virtual keyboard on the right side of the GUI when the detected device orientation is changed from left hand device orientation to right hand device orientation.

17. The non-transitory computer readable storage medium of claim 13, wherein the computer program mechanism including instructions to keep the relative positions of a plurality of soft keys on the virtual keyboard fixed during updating.

* * * * *